US012609136B2

(12) United States Patent　(10) Patent No.: US 12,609,136 B2
Goncharov et al.　(45) Date of Patent: Apr. 21, 2026

(54) SPIN WAVE ASSISTED MAMR RECORDING HEAD

(71) Applicant: Western Digital Technologies, Inc., San Jose, CA (US)

(72) Inventors: Alexander Goncharov, Morgan Hill, CA (US); Muhammad Asif Bashir, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 86 days.

(21) Appl. No.: 18/636,683

(22) Filed: Apr. 16, 2024

(65) Prior Publication Data

US 2025/0322844 A1　Oct. 16, 2025

(51) Int. Cl.
　*G11B 5/31*　(2006.01)
　*G11B 5/127*　(2006.01)
　*G11B 5/235*　(2006.01)
　*G11B 5/00*　(2006.01)
(52) U.S. Cl.
　CPC .......... *G11B 5/3116* (2013.01); *G11B 5/1278* (2013.01); *G11B 5/235* (2013.01); *G11B 5/3133* (2013.01); *G11B 5/314* (2013.01); *G11B 5/3146* (2013.01); *G11B 2005/0024* (2013.01)
(58) Field of Classification Search
None
See application file for complete search history.

(56) References Cited

U.S. PATENT DOCUMENTS

| | | | |
|---|---|---|---|
| 7,920,357 | B2 | 4/2011 | Sato et al. |
| 7,982,996 | B2 | 7/2011 | Smith et al. |
| 8,107,352 | B1 | 1/2012 | Yamanaka et al. |
| 8,917,465 | B1 | 12/2014 | Contreras et al. |
| 9,311,934 | B1 | 4/2016 | Shiimoto et al. |
| 9,672,846 | B1 | 6/2017 | Tanaka et al. |
| 10,236,021 | B2 | 3/2019 | Narita et al. |
| 10,446,178 | B1 | 10/2019 | Tang et al. |
| 10,643,642 | B2 | 5/2020 | De Albuquerque et al. |

(Continued)

OTHER PUBLICATIONS

"TDK Ships Prototype Heads for Microwave-Assisted Magnetic Recording", Magnetics Business & Technology, Jan. 18, 2022, pp. 1-2, <https://magneticsmag.com/tdk-ships-prototype-heads-for-microwave-assisted-magnetic-recording/>.

(Continued)

*Primary Examiner* — Craig A. Renner
(74) *Attorney, Agent, or Firm* — Patterson + Sheridan, LLP

(57)　ABSTRACT

Aspects of the present disclosure generally relate to a magnetic recording device comprising a magnetic recording head. The magnetic recording head comprises a main pole, the main pole comprising a contact recessed from a media facing surface (MFS) and a contact terminal coupled to the contact, a trailing shield disposed adjacent to the main pole, a spin torque oscillator (STO) device disposed between the main pole and the trailing shield, a leading shield disposed adjacent to the main pole, the contact being disposed over the leading shield, a first alternating current (AC) source coupled to the main pole and the contact terminal, and a second AC source coupled to the trailing shield and the main pole. The first AC source is configured to generate an AC field, and the AC field is configured to generate spin waves near the contact to transfer energy to the STO device.

20 Claims, 7 Drawing Sheets

(56) References Cited

U.S. PATENT DOCUMENTS

| 10,762,917 | B1 * | 9/2020 | Le et al. | ............... | G11B 5/3116 |
| 10,997,988 | B1 * | 5/2021 | Le et al. | .............. | G11B 5/1278 |
| 11,049,513 | B1 * | 6/2021 | Le et al. | ................ | G11B 5/235 |
| 11,600,293 | B1 | 3/2023 | Lam et al. | | |
| 11,869,548 | B1 | 1/2024 | Asif Bashir et al. | | |

OTHER PUBLICATIONS

Takagishi, Masayuki et al., "Microwave assisted magnetic Recording: Physics and application to hard disk drives", Journal of Magnetism and Magnetic Materials, vol. 563, Dec. 1, 2022, pp. 1-6, <https://www.sciencedirect.com/science/article/abs/pii/S030488532200748X>.

"Microwave-assisted Magnetic Recording Technology for HDDs Achieving Higher Recording Density", Toshiba, pp. 1-5, <https://toshiba.semicon-storage.com/content/dam/toshiba-ss-v3/master/en/company/technical-review/pdf/technical-review-microwave-assisted-magnetic-recording-technology_e.pdf>, 2020.

Zhou, T. et al., "Stability Study of Spin Torque Oscillator for Microwave Assisted Magnetic Recording (MAMR)", IEEE, 2015, p. 1, <https://ieeexplore.ieee.org/abstract/document/7157098>.

* cited by examiner

SPIN WAVE ASSISTED MAMR RECORDING HEAD

BACKGROUND OF THE DISCLOSURE

Field of the Disclosure

Embodiments of the present disclosure generally relate to a magnetic recording head assembly, such as a write head of a data storage device or a magnetic media drive.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic write head at a media facing surface. As the main pole becomes smaller, the writing field becomes smaller as well, limiting the effectiveness of the magnetic write head.

Heat-assisted magnetic recording (HAMR) and microwave assisted magnetic recording (MAMR) are two types of energy-assisted recording technology to improve the recording density of a magnetic recording medium, such as a HDD. In MAMR, an oscillation element or device, such as a spin torque oscillator (STO), is located next to or near the write element in order to produce a high-frequency magnetic field, such as in a microwave frequency band. The high-frequency magnetic field (in addition to a recording magnetic field emanated from a main pole of the write element) reduces an effective coercivity of a magnetic recording medium used to store data and allows writing of the magnetic recording medium at lower magnetic fields emanated from the write pole.

Another challenge for HDD designs where a current is applied through a write head to write data to media is that higher amounts of current can cause a temperature of the write head to increase, which can cause degradation such as at a media facing surface (MFS) or at the STO. The degradation can hinder performance and reliability of the write head, and can even render the write head inoperable. However, lowering currents can limit writing fields.

Therefore, there is a need for write heads that simply and effectively facilitate write head performance reliability and enhanced magnetic write fields.

SUMMARY OF THE DISCLOSURE

Aspects of the present disclosure generally relate to a magnetic recording device comprising a magnetic recording head. The magnetic recording head comprises a main pole, the main pole comprising a contact recessed from a media facing surface (MFS) and a contact terminal coupled to the contact, a trailing shield disposed adjacent to the main pole, a spin torque oscillator (STO) device disposed between the main pole and the trailing shield, a leading shield disposed adjacent to the main pole, the contact being disposed over the leading shield, a first alternating current (AC) source coupled to the main pole and the contact terminal, and a second AC source coupled to the trailing shield and the main pole. The first AC source is configured to generate an AC field, and the AC field is configured to generate spin waves near the contact to transfer energy to the STO device.

In one embodiment, a magnetic recording head comprises a main pole, the main pole comprising: a first contact recessed from a media facing surface (MFS), and a second contact recessed from the MFS, wherein a conductive current path is formed from the second contact through a portion of the main pole to the first contact, a trailing shield disposed adjacent to the main pole, a spin torque oscillator (STO) device disposed between the main pole and the trailing shield at the MFS, and a leading shield disposed adjacent to the main pole, the leading shield being disposed between the first contact and the MFS.

In another embodiment, a magnetic recording device comprises a main pole, the main pole comprising a contact recessed from a media facing surface (MFS) and a contact terminal coupled to the contact, a trailing shield disposed adjacent to the main pole, a spin torque oscillator (STO) device disposed between the main pole and the trailing shield at the MFS, a leading shield disposed adjacent to the main pole, the leading shield being disposed between the contact and the MFS, a first alternating current (AC) power source coupled to the contact terminal, and a second AC power source coupled to the trailing shield.

In yet another embodiment, a magnetic recording device comprises a main pole, the main pole comprising a contact recessed from a media facing surface (MFS) and a contact terminal coupled to the contact, a trailing shield disposed adjacent to the main pole, a spin torque oscillator (STO) device disposed between the main pole and the trailing shield at the MFS, a leading shield disposed adjacent to the main pole, the leading shield being disposed between the contact and the MFS, a first terminal coupled to the trailing shield, a second terminal coupled to the main pole, and a third terminal coupled to the contact terminal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

3

Figure 5A:
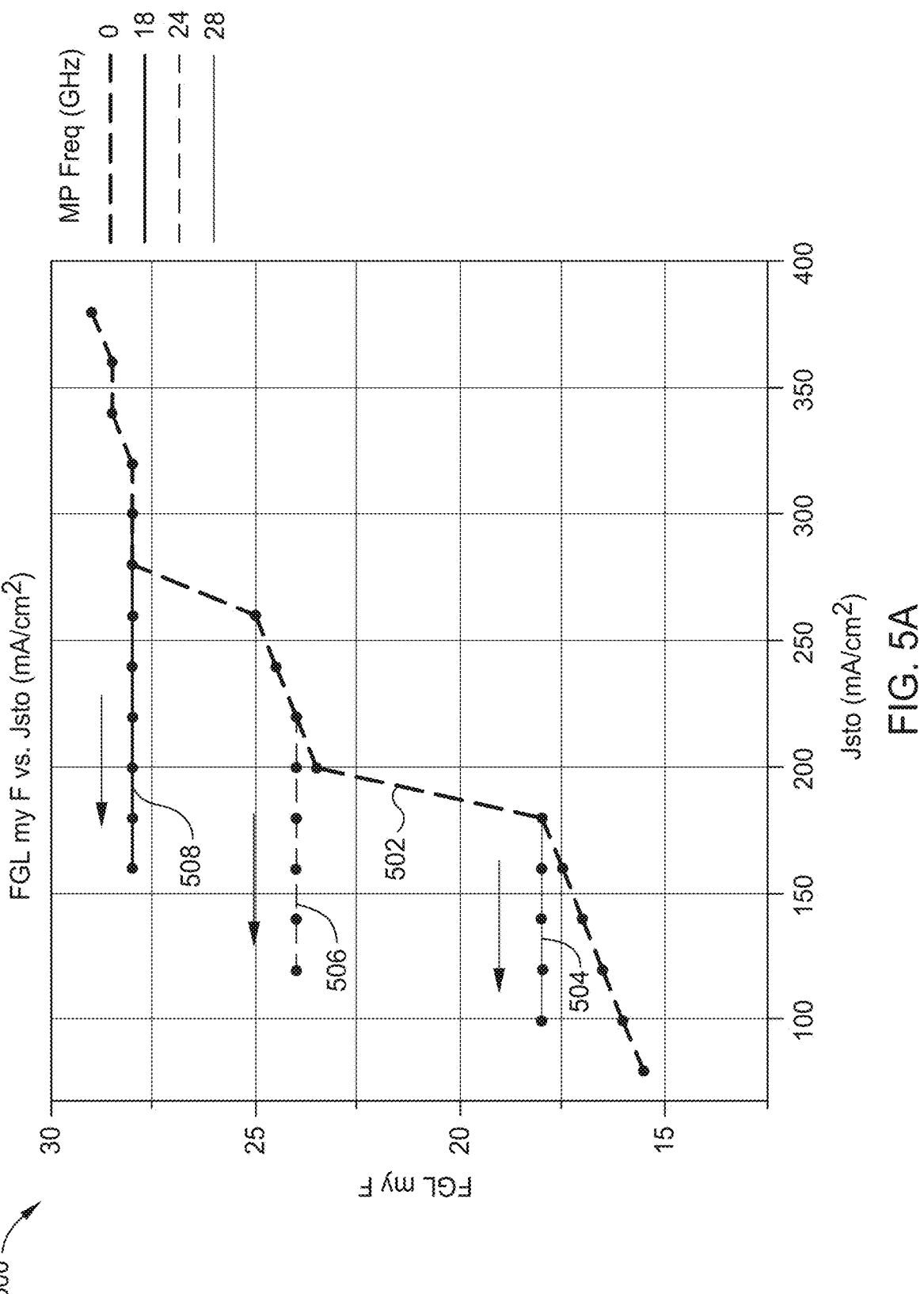
FIG. 5A illustrates a graph showing frequency of the precession of the magnetization in the FGL of the STO device versus the STO bias obtained by the proper combination of both AC sources, according to one embodiment.
Figure 5B:
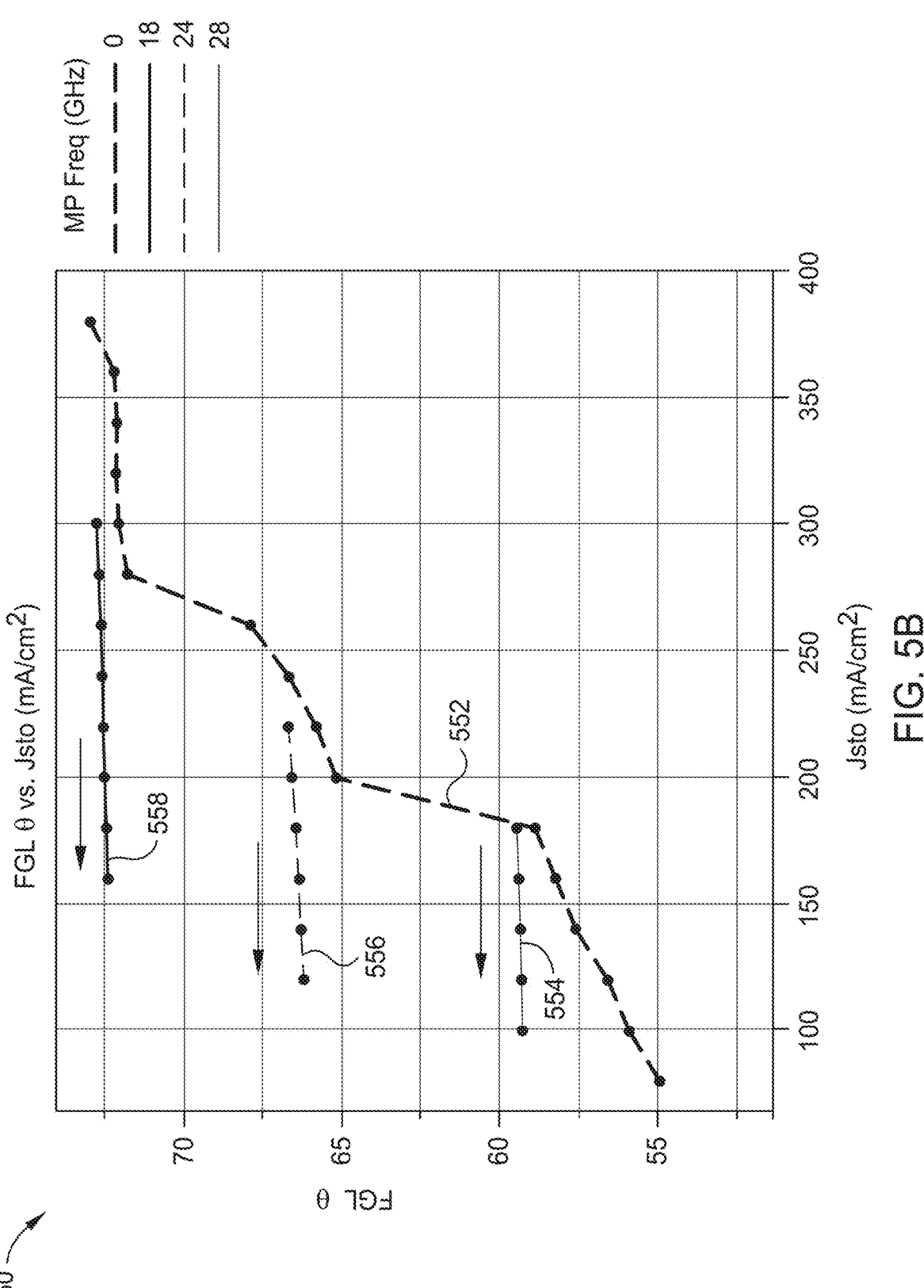

FIG. 5B illustrates a graph showing the angle of the magnetization in the FGL of the STO device versus the STO bias obtained by the proper combination of both AC sources, according to one embodiment. To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Conventional recording heads for MAMR use an STO in the writer gap for generating an AC field in the recording medium. A typical STO includes two magnetic layers: a spin polarizing layer (SPL) and a field generating layer (FGL). When a constant charge current flows through the STO, a spin current is generated between two magnetic layers leading to the spin transfer torque phenomenon. The action of the spin transfer torque results in the anti-damping effect leading to the precession of both layers around the writer gap field. Microwave energy from the FGL is absorbed by recording medium grains, effectively reducing the energy barrier to switch, therefore leading to the assisted switching of the magnetization in the recording medium. The energy absorption is maximized at the resonance frequency which is defined by the writer's DC field, field angle, medium anisotropy field, and microwave field strength.

A shortcoming in this conventional MAMR approach is energy loss. In addition to the useful work performed by the AC field in assisting switching of the recording medium, there is an unavoidable energy loss caused by the interaction between the STO and the magnetic writer itself. Magnetization of the FGL and the writer is coupled magnetostatically, and as a result, part of microwave energy ends up being used to excite spin waves in the main pole and surrounding shields in the magnetic writer. This leads to high bias requirements for the STO, increasing undesired heating and resulting in poor reliability of the MAMR head. It also prevents the STO from developing high angle/high frequency oscillations as compared to the test chip conditions where there is no energy loss due to the coupling to the large magnetic device in the form of the writer.

Various aspects and embodiments of the present disclosure are directed to leveraging the ferromagnetic resonance phenomenon in the main pole to assist the STO in the writer gap. In various embodiments, the writer has a specially designed alternating electric current flow in the main pole, used to generating the AC magnetic field in the pole itself. The AC field in the magnetic main pole generates spin waves, which propagate towards the ABS and the writer gap, where they transfer the energy to the STO and the recording medium. As a result, the required STO bias is significantly reduced (leading to improved reliability), and recording the medium receives extra AC field generated by the oscillating magnetic pole.

Aspects of the present disclosure generally relate to a magnetic recording device comprising a magnetic recording head. The magnetic recording head comprises a main pole, the main pole comprising a contact recessed from a media facing surface (MFS) and a contact terminal coupled to the contact, a trailing shield disposed adjacent to the main pole, a spin torque oscillator (STO) device disposed between the main pole and the trailing shield, a leading shield disposed adjacent to the main pole, the contact being disposed over the leading shield, a first alternating current (AC) source coupled to the main pole and the contact terminal, and a second AC source coupled to the trailing shield and the main pole. The first AC source is configured to generate an AC field, and the AC field is configured to generate spin waves near the contact to transfer energy to the STO device.

Figure 1:
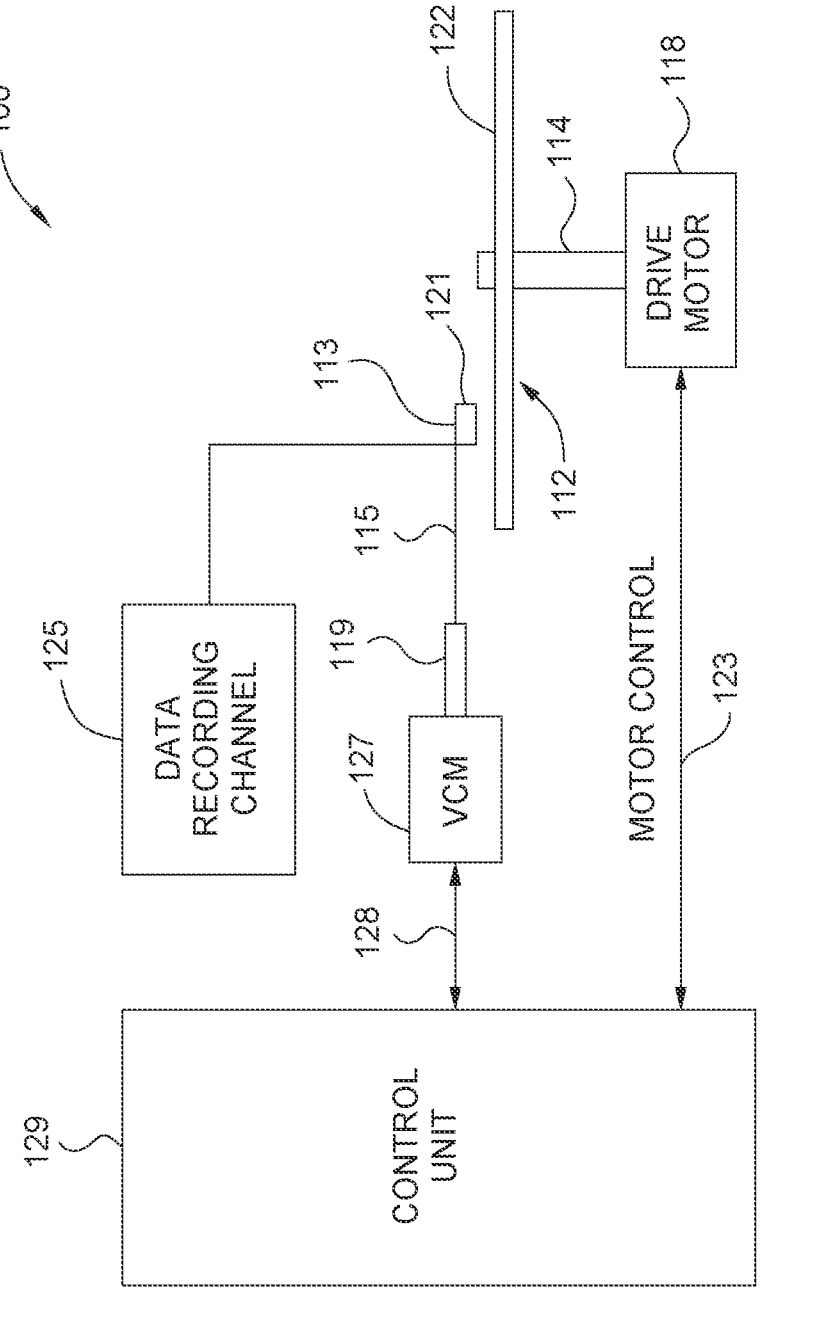
FIG. 1 illustrates a schematic view of a disk drive, according to one implementation.

FIG. 1 illustrates a schematic view of a disk drive 100, according to one implementation. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field. The direction and speed of the coil movements are controlled by the motor current signals supplied by a control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the magnetic media 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the magnetic media 112.

The various components of the disk drive 100 are controlled in operation by control signals generated by the control unit 129, such as access control signals and internal clock signals. The control unit 129 can include logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on the magnetic media 112. Write and read signals are communicated to and from write and read heads on the magnetic head assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
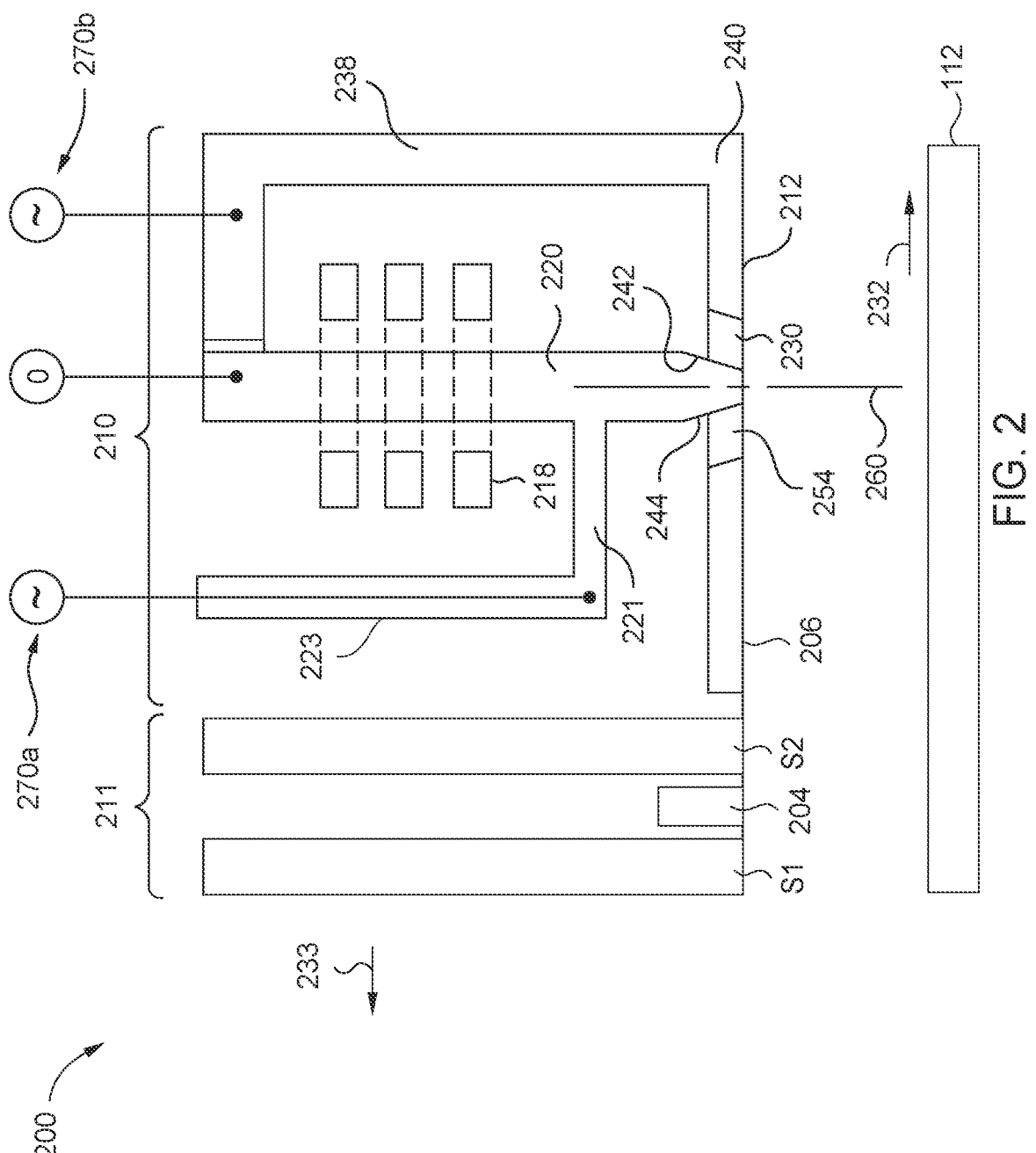
FIG. 2 is a fragmented and schematic cross-sectional side view through a center of a read/write head facing the magnetic media, according to one implementation.

FIG. 2 is a schematic illustration of certain embodiments of a cross sectional side view of a read/write head 200 facing the magnetic disk 112. The read/write head 200 may be a part of the disk drive 100 described in FIG. 1. The read/write head 200 may be a microwave assisted magnetic recording (MAMR) head. The read/write head 200 includes a media facing surface (MFS) 212, such as an air bearing surface (ABS), facing the disk 112. As shown in FIG. 2, the magnetic disk 112 relatively moves in the direction indicated by the arrow 232 and the read/write head 200 relatively moves in the direction indicated by the arrow 233.

In some embodiments, the read/write head 200 includes a magnetic read head 211. The magnetic read head 211 may include a sensing element 204 disposed between shields S1 and S2. In certain embodiments, the sensing element 204 is a magneto-resistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the magnetic disk 112, such as perpendicular recorded bits or longitudinal recorded bits, are detectable by the sensing element 204 as the recorded bits.

The read/write head 200 includes a write head 210. The write head 210 includes a return pole 238, a main pole 220, a trailing shield 240, and a coil 218 that excites the main pole 220. The main pole 220 may comprise a contact 221 recessed from the MFS, and a contact terminal 223 coupled to the contact 221. The contact 221 extends perpendicularly to a longitudinal axis 260 of the main pole 220. A leading gap 254 is disposed between the main pole 220 and the leading shield 206, and a trailing gap 230 is disposed between the main pole 220 and the trailing shield 240. In certain embodiments of the write head 210, a spin torque oscillator device (shown in FIGS. 3A-3B) is disposed in the trailing gap 230 at the MFS.

The coil 218 may have a "pancake" structure which winds around a back-contact between the main pole 220, a return pole 238, and a contact terminal 223, instead of a "helical" structure shown in FIG. 2. A recording magnetic field (e.g., a write field) is generated from the main pole 220 and the trailing shield 240 facilitates making the magnetic field gradient of the main pole 220 steep. The main pole 220 may be a magnetic material such as an FeCo alloy. In one embodiment, which can be combined with other embodiments, the main pole 220 has a saturated magnetization (Ms) of 2.4 T and a thickness of about 300 nanometers (nm). The trailing shield 240 may be a magnetic material such as NiFe alloy. In one embodiment, which can be combined with other embodiments, the trailing shield 240 has an Ms of about 1.6 T.

In certain embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown) in which the trailing side and the leading side are substantially parallel.

A first AC power source 270a is coupled to the main pole 220, and a second AC power source 270b is the trailing shield 240 to independently provide current through the trailing gap 230 and to the contact 221 of the main pole 220. The AC power sources 270a, 270b are configured to supply alternating currents.

In certain embodiments of the write head 210, the trailing gap 230 comprises a non-magnetic conductive material. The non-magnetic conductive material of the trailing gap 230 includes Au, Ag, Pt, Ta, Ir, Al, Si, Ge, Ti, Cu, Pd, Ru, Mo, W, other non-magnetic metals, alloys thereof, and multiple layers thereof. The non-magnetic conductive material of the leading gap 254 includes Au, Ag, Pt, Ta, Ir, Al, Si, Ge, Ti, Cu, Pd, Ru, Mo, W, other non-magnetic metals, alloys thereof, and multiple layers thereof. In other embodiments, the trailing gap 230 and/or leading gap 254 may each instead comprise a spintronic device with a combination or magnetic and non-magnetic materials, such as an STO device as shown in FIG. 3A.

Figure 3A:
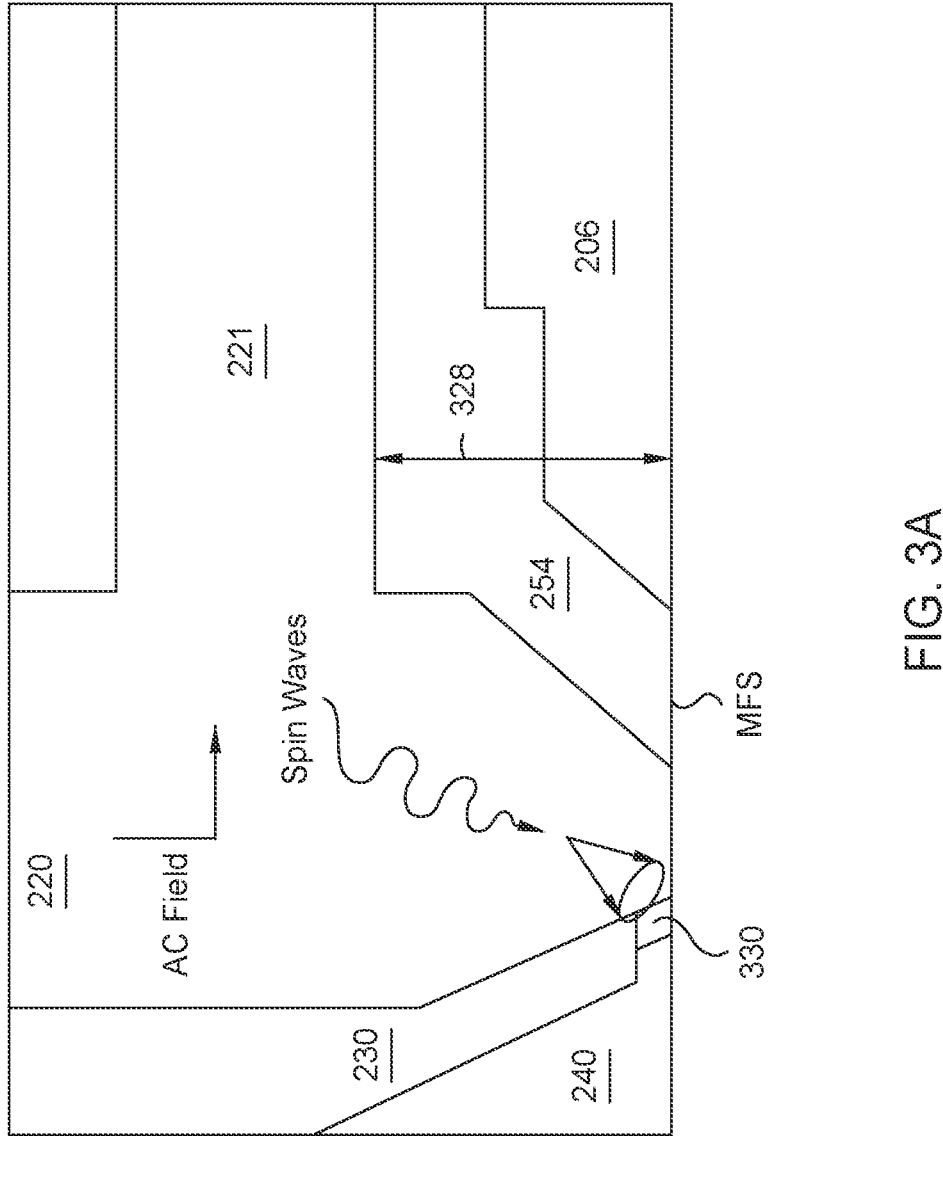
FIG. 3A illustrates a cross-sectional view of a magnetic recording head, according to one embodiment.
Figure 3A:
Figure 3A:
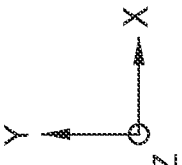
Figure 3B:
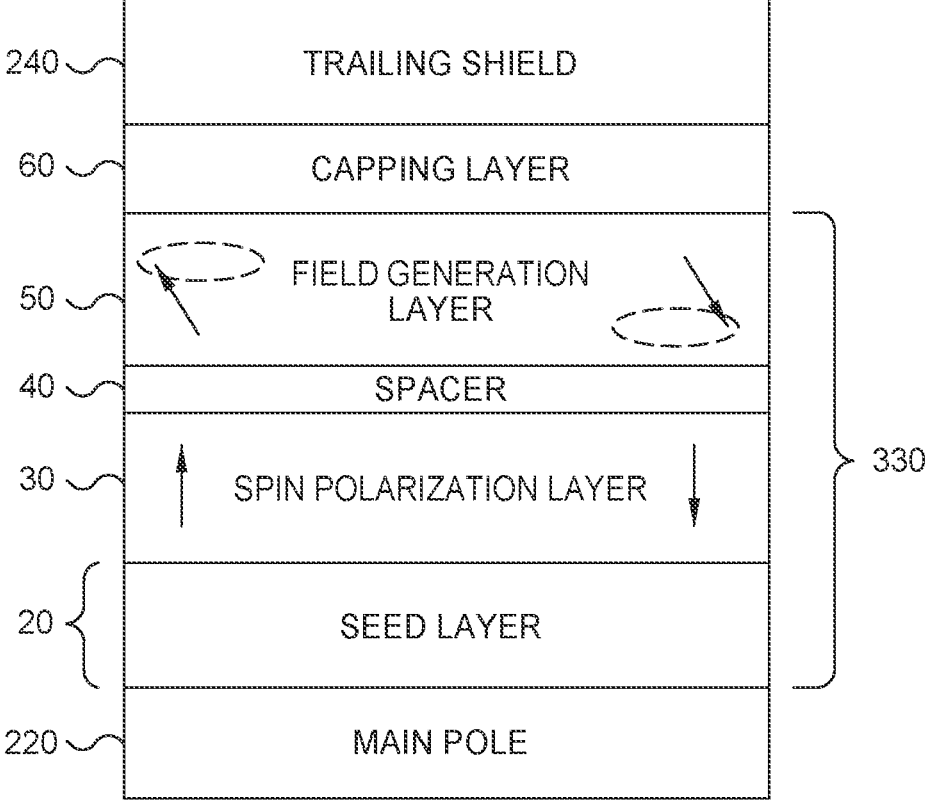
FIG. 3B illustrates a STO device of the magnetic recording head of FIG. 3A, according to one embodiment.

FIG. 3A illustrates a cross-sectional view of a magnetic recording head 300, according to one embodiment. FIG. 3B illustrates a STO device 330 of the magnetic recording head 300, according to one embodiment. The magnetic recording head 300 may be the write head 210 of FIG. 2. The magnetic recording head 300 may be a part of a head assembly or read/write head, such as the read/write head 200 of FIG. 2 and/or the disk drive 100 described in FIG. 1. The magnetic recording head 300 may be referred to herein as a write head 300.

The write head 300 comprises the main pole 220, the trailing shield 240, and the leading shield 206. The STO device 330 is disposed between the main pole 220 and the trailing shield 240 at the MFS in the trailing gap 230. The contact 221 of the main pole 220 extends in the x-direction, recessed from the MFS, above the leading gap 254 and leading shield 206. The contact 221 is recessed from the MFS a distance 328 of greater than 100 nm, such as about 100 nm to about 200 nm. The contact 221 is coupled to a contact terminal 223 (like shown in FIGS. 2 and 4, but the left-right orientation is flipped with respect to FIG. 3A in those figures). The contact 221 and the contact terminal 223 may each individually comprise a conducting, non-magnetic material, such as Cu.

When an alternating current (AC) is applied to the main pole 220 through the first AC power source 270a, the AC field generated by the AC current is directed towards the contact 221, away from the STO device 330 and MFS. In other words, the AC current flows in an L-like shape, down the main pole 220 towards the MFS to the contact 221. The AC field excites magnetization near the contact 221, generating energy. The energy from the AC field is transferred by spin waves to the main pole tip and then by the magnetostatic coupling to the STO device 330 to assist oscillation of the STO device 330. The frequency and oscillation of the STO device 330 matches or is synchronized with the frequency of the AC current in the main pole 220. However, the amplitude and bias on the STO device 330 and the main pole 220 are different. As such, bias current through the STO device 330 remains constant; however, the bias on the main pole 220 and contact 221 is alternating. Such conditions can be achieved by applying the second AC power source to the source 270b with a DC bias. The AC field and current are maximized in the region near the contact 221, away from the MFS, resulting in resistance and heat being easy to manage. Moreover, the heat generated from the AC current is primarily directed towards the contact 221, reducing heat at the MFS, thus preventing breakdown of the STO 330.

FIG. 3B is a schematic plan view of a media facing surface of certain embodiments of a trailing gap 230 of the write head 210 comprising a STO device 330, such as the write head 210 of FIGS. 2 and 3A. The STO device 330 is positioned proximate the main pole 220 and reduces the coercive force of the magnetic medium, so that smaller recording fields can be used to record data. A bias current applied to the trailing gap 230 comprising a STO device 330 from the power source 270a and/or the power source 270b of FIG. 2 produces an assisting magnetic field, such as a microwave field. The bias current is an alternating current (AC).

In certain embodiments, the STO device 330 includes a seed layer 20 over or on the main pole 220, a spin polarization layer (SPL) 30 over or on the seed layer 20, a spacer layer 40 over or on the SPL 30, and a field generation layer (FGL) 50 over or on the spacer layer 40. In other embodiments, there may be layers in additional to these ones shown.

In certain embodiments, the seed layer 20 comprises one or more of ruthenium, copper, tantalum, other non-magnetic materials, alloys thereof, and multiple layers thereof. In certain embodiments, the seed layer 20 resets or provides a texture break for the growth of the SPL 30 over the seed layer 20 for low structural defects of the SPL 30. Low structural defects of the SPL 30 results in low coercivity in magnetization reversal of the SPL 30, lower critical current for reversal of the SPL 30, and better yield in the formation of the SPL 30. If an SPL is directly formed on a main pole, such as CoFe alloy main pole having a random texture, the SPL would undesirably having a high amount of structural defects since the random texture of the main pole is a poor surface for formation of the SPL. For example, a seed layer comprising tantalum provides a nano-crystalline structure formed over the random texture of the main pole 220. The nano-crystalline structure provides a smooth surface for formation of structured layers or crystalline layers thereover with low structure/crystal defects. In certain embodiments, the seed layer 20 provides a surface for good growth of structured and/or crystalline layers such, such as face centered cubic (FCC) metal alloys, body center cubic (BCC) metal alloys, and ordered phase alloys. For example, a seed layer 20 comprising ruthenium has a hexagonal close packed structure. The hexagonal close packed (HCP) structure provides a good template surface for growth or interfacing with a FCC layer, a BCC layer, or a Heusler layer with low structural defects.

In certain embodiments, the SPL 30 comprises one or more of NiFe, CoFe, CoFeNi, CoMnGe, NiCo, NiFeCu, CoFeMnGe, CoMnSi, CoFeSi, other high magnetic anisotropy materials, other Heusler alloys, other suitable magnetic layers, and multiple layers thereof. The SPL 30 can comprise a material having magnetic anisotropy oriented in a direction longitudinal to the film plane of the SPL 30 or perpendicular to the film plane of the SPL 30. The SPL 30 transmits spin torque to the FGL 50 causing oscillation of the magnetization of the FGL 50 at high velocity in a plane to thereby generate a high-frequency magnetic field, such as a microwave field. The magnetization of the SPL 30 is reversed to switch the oscillation direction of the magnetization of the FGL 50 to establish a consistent microwave field when the recording field is changed from the switch in polarization of the main pole 220 for low write errors.

The STO device 330 comprises a spacer layer 40 between the SPL 30 and the FGL 50. The spacer layer 40 includes one or more non-magnetic conductive materials, such as Au, Ag, Pt, Ta, Ir, Al, Si, Ge, Ti, Cu, Pd, Ru, Mo, W, AgSn, alloys thereof, and multiple layers thereof. The spacer layer 40 may reduce exchange coupling between the SPL 30 and the FGL 50. The spacer layer 40 may be made of a material having a high spin transmissivity for spin torque transfer from the SPL 30 to the FGL 50.

FGL 50 may include one or more of FeCo, NiFe, CoPt, CoCr, CoIr, CoFeAli, CoFeGe, CoMnGe, CoFeAl, CoFeSi, CoMnSi, TbFeCo, other magnetic materials, and multiple layers thereof. Spin torque transmitted from the SPL 30 to the FGL 50 causes oscillation of the magnetization of the FGL 50 generating a microwave field (a high-frequency magnetic field). The recording magnetic field applied from the main pole 220 to the STO device 330 maintains the magnetization direction of the SPL 30 and the FGL 50 so that the FGL 50 can oscillate to produce a microwave field. When an electron current flows through the STO device 330 from the seed layer 20 to the SPL 30, such as from the main pole 220 to the trailing shield 240, the electrons passing through the SPL 30 are polarized. The stream of polarized electrons from the SPL 30 to the FGL 50 imparts a spin torque to the FGL 50 causing the FGL 50 to emit a high-frequency magnetic field to the magnetic recording medium reducing the coercive force of the recording medium and reducing the switch field threshold. In addition to this conventional mechanism for activating the FGL oscillation, the above-mentioned spin wave energy from the main pole driven by the AC-bias provides an assistive effect on the STO, significantly lowering the amount of STO bias needed as compared to the conventional MAMR approach.

In certain embodiments, a capping layer 60 may be on or over the STO device 330 and between the FGL 50 and the trailing shield 240. The capping layer 60 may comprise one or more magnetic layers, one or more non-magnetic conductive layers, or combinations thereof. Examples of a non-magnetic conductive layer of the capping layer 60 may include NiCr, Cr, Pt, Ir, Ta, Ru, other non-magnetic conductive materials, and alloys thereof. Examples of a magnetic layer of the capping layer 60 may include Fe, Co, Ni, other magnetic materials, and alloys thereof. In certain embodiments, the capping layer 60 protects the STO device 330 during formation of the STO device and formation of the magnetic write head 210, such as during deposition, patterning, cleaning, etc.

An electron current is applied to STO device 330 from a power source 270a and/or 270b to produce a microwave field. The STO device 330 may be electrically coupled to the main pole 220 and the trailing shield 240 in which the main pole 220 and the trailing shield are separated by an insulating layer. The power source 270a and/or 270b may provide electron current to the STO device 330 through the main pole 220 and the trailing shield 240. The power source 270a and/or 270b may flow electron current from the main pole 220 through the STO device 330 to the trailing shield 240 or may flow electron current from the trailing shield 240 through the STO device 330 to the main pole 220 depending on the orientation of a spin polarization and a field generation layer of the STO device. In other embodiments, the STO device 330 may be coupled to electrical leads providing an electron current other than from the main pole and/or the trailing shield. The amount of current required for STO operation is reduced compared to prior conventional MAMR approaches due to the assistive spin wave energy from the main pole.

Figure 4:
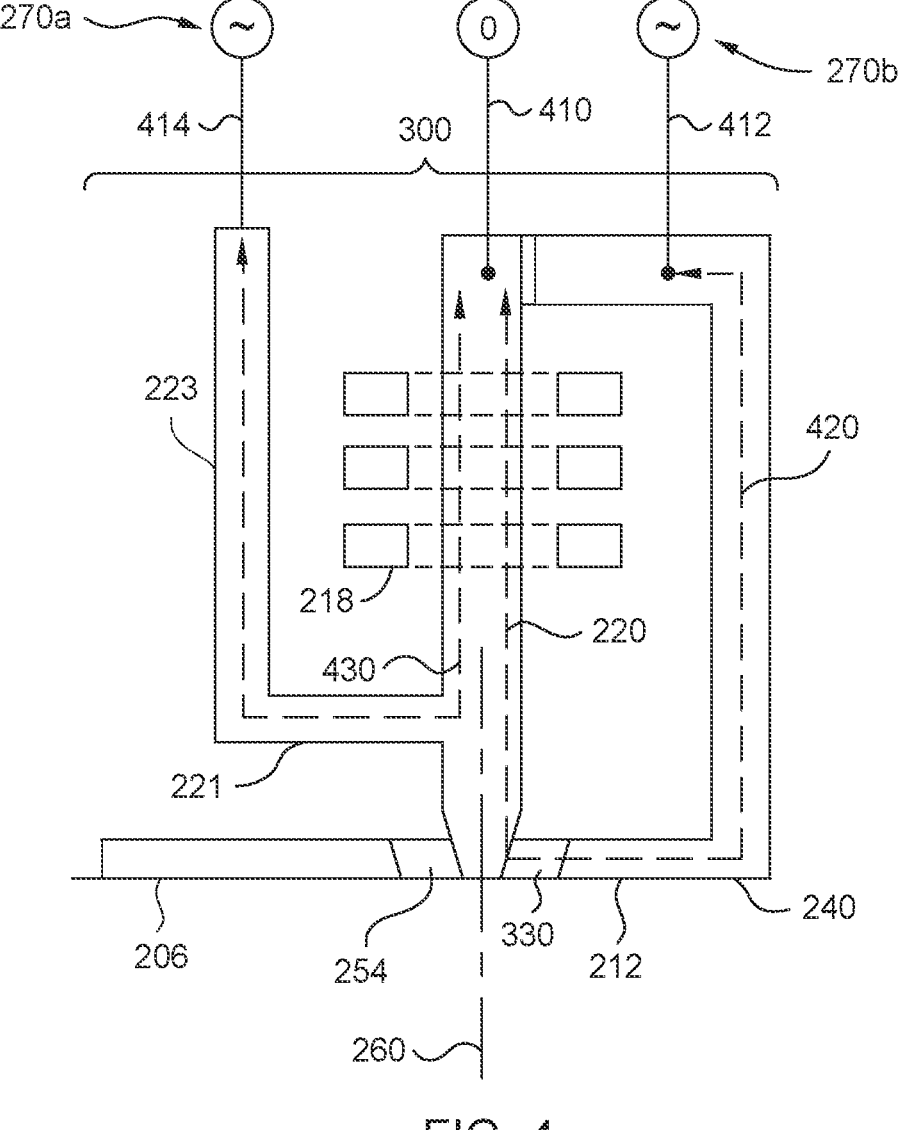
FIG. 4 illustrates the current paths of the magnetic recording head of FIG. 3A, according to one embodiment.

FIG. 4 illustrates the current paths of the magnetic recording head 300 of FIG. 3A, according to one embodiment. The write head 300 comprises a first terminal 410 coupled to the main pole 220, a second terminal 412 coupled to the trailing shield 240, and a third terminal 414 coupled to the contact terminal 223. The first terminal 410 serves a common terminal of a first current path 420 and a second current path 430.

The first terminal 410 coupled to the main pole 220 and the second terminal 412 coupled to the trailing shield 240 form a first current path 420 through the trailing shield 240, the STO device 330, and through the main pole 220 (in which the electron flow is in the opposite direction of the current flow). An AC current applied by the second AC power source 270b to the first current path 420 creates a current bias for the STO device 330. The AC current is supplied at a frequency of about 15 GHz to about 30 GHz to the first current path 420.

The STO assisting magnetic field is produced from the precession of the magnetization in the FGL 50 of the STO device 330. The magnetization precession is facilitated by the spin transfer torque by the current flow through the trailing gap. The STO assisting magnetic field produced by a bias current through the first current path 420 of the trailing shield 240, the STO device 330, and through the main pole 220 helps to reduce the sector error rate of recording data to a magnetic media. The STO assisting magnetic field plateaus at a certain bias current due to saturation of the magnetization angle in the FGL 50. A bias current to the first current path 420 through the trailing gap comprising the STO device 330 also produces a current assist effect in which the current assist effect increases with increasing current.

The first terminal 410 is coupled to the main pole 220 and the third terminal 414 is coupled to the contact terminal 223 to form a second current path 430 through the main pole 220, the contact 221, to the contact terminal 223. Another assisting magnetic field is produced from the second current path 430 through the leading shield 206, leading gap 254 and the main pole 220. An AC current applied by the first AC power source 270a to the second current path 430 generates an AC field. The AC current is supplied at a frequency of about 15 GHz to about 30 GHz to the second current path 430. Bias current through the STO device 330 remains constant through the first current path 420; however, the bias on the main pole 220 and contact 221 is alternating. Such conditions can be achieved by applying the second AC power source to the source 270b with a DC bias.

The AC field is directed towards the contact 221, away from the STO device 330 and MFS. In other words, the AC current flows in an L-like shape, down the main pole 220 towards the MFS to the contact 221. The AC field excites magnetization near the contact 221, generating energy. The energy from the AC field is transferred by spin waves and magnetostatic coupling to the STO device 330 to assist oscillation of the STO device 330. The frequency and oscillation of the STO device 330 matches or is synchronized with the frequency of the AC current in the main pole 220 provided by the second current path 530. However, the amplitude and bias on the STO device 330 and the main pole 220 are different. As such, bias current through the STO device 330 remains constant, and the bias on the main pole 220 and contact 221 is alternating. The AC field and current are maximized in the region near the contact 221, away from the MFS, resulting in resistance and heat being easy to control. Moreover, the heat generated from the AC current is primarily directed towards the contact 221, reducing heat at the MFS, thus preventing breakdown of the STO device 330.

The first terminal 410, the second terminal 412, and the third terminal 414 allow separate control of the AC current to the first current path 420 and the second current path 430. Different levels of current, amplitude, and/or bias may be supplied through the first current path 420 and the second current path 430 to allow adjustment of the current flowing through the STO device 330 from the first current path 420 and of the spin waves from the second current path 430.

FIG. 5A illustrates a graph 500 showing frequency of the precession of the magnetization in the FGL 50 of the STO device 330 (Y-axis) versus the STO bias applied (X-axis), comparing results of the case without the assistive spin wave energy against results of cases obtained by the proper combination of both AC sources, according to one embodiment. FIG. 5B illustrates a graph 550 showing the angle of the magnetization in the FGL 50 of the STO device 330 (Y-axis) versus the STO bias applied (X-axis), comparing results of the case without the assistive spin wave energy against results of cases obtained by the proper combination of both AC sources, according to one embodiment. The graphs 500 and 550 may represent the results from operating the magnetic recording head 300 of FIGS. 3A and 4.

In the graph 500, line 502 represents the main pole having a frequency of 0 GHz (no spin wave assist present), line 504 represents the main pole having a frequency of 18 GHz, line 506 represents the main pole having a frequency of 24 GHz, and line 508 represents the main pole having a frequency of 28 GHz. Comparing when the main pole has a frequency of 0 GHz (no spin wave assist present, line 502) versus when the main pole has a frequency of 18 GHz (line 504), 24 GHz (line 506), and 28 GHz (line 508), the bias on the STO device required to achieve the same levels of FGL precession frequency is significantly reduced when the spin wave assist is present (as indicated by the arrows above the lines 504-508). The current through the STO device decreases from about 175 MA/cm$^2$ to about 100 MA/cm$^2$ at 18 GHz main pole frequency (line 502), from about 225 MA/cm$^2$ to about 110 MA/cm$^2$ at 24 GHz main pole frequency (line 506), and from about 300 MA/cm$^2$ to about 150 MA/cm$^2$ at 28 GHz main pole frequency (line 508).

Similarly, in the graph 550, line 552 represents the main pole having a frequency of 0 GHz (no spin wave assist present), line 554 represents the main pole having a frequency of 18 GHz, line 556 represents the main pole having a frequency of 24 GHz, and line 558 represents the main pole having a frequency of 28 GHz. Comparing when the main pole has a frequency of 0 GHz (no spin wave assist present, line 552) versus when the main pole has a frequency of 18 GHz (line 554), 24 GHz (line 556), and 28 GHz (line 558) the bias on the STO device required to achieve the same levels of FGL angle is significantly reduced when the spin wave assist is present (as indicated by the arrows above the lines 554-558). The current through the STO device decreases from about 175 MA/cm$^2$ to about 100 MA/cm$^2$ at 18 GHz (line 552), from about 225 MA/cm$^2$ to about 110 MA/cm$^2$ at 24 GHz (line 556), and from about 300 MA/cm$^2$ to about 150 MA/cm$^2$ at 28 GHz (line 558).

Therefore, by directing the AC field towards the contact of the main pole in a magnetic recording head, away from the STO device and MFS, energy from the AC field is transferred by spin waves and magnetostatic coupling to the STO device to assist oscillation of the STO device. The frequency and oscillation of the STO device matches or is synchronized with the frequency of the AC current in the main pole. As such, bias on the STO device is reduced. The AC field and current are maximized in the region near the contact, away from the MFS, resulting in resistance and heat being easy to control. Moreover, the heat generated from the AC current is primarily directed towards the contact, reducing heat at the MFS, thus preventing breakdown of the STO device and prolonging the life of the magnetic recording head.

In one embodiment, a magnetic recording head comprises a main pole, the main pole comprising: a first contact recessed from a media facing surface (MFS), and a second contact recessed from the MFS, wherein a conductive current path is formed from the second contact through a portion of the main pole to the first contact, a trailing shield disposed adjacent to the main pole, a spin torque oscillator (STO) device disposed between the main pole and the trailing shield at the MFS, and a leading shield disposed adjacent to the main pole, the leading shield being disposed between the first contact and the MFS.

The first contact is recessed a distance of about 100 nm to about 200 nm from the MFS. The first contact is disposed perpendicular to a longitudinal axis of the main pole. The first contact is coupled with an alternative current (AC) source. A magnetic recording device comprises the magnetic recording head. During operation, an alternating current is configured to flow from the main pole towards the MFS to the first contact in an L-like shape.

In another embodiment, a magnetic recording device comprises a main pole, the main pole comprising a contact recessed from a media facing surface (MFS) and a contact terminal coupled to the contact, a trailing shield disposed adjacent to the main pole, a spin torque oscillator (STO) device disposed between the main pole and the trailing shield at the MFS, a leading shield disposed adjacent to the main pole, the leading shield being disposed between the contact and the MFS, a first alternating current (AC) power source coupled to the contact terminal, and a second AC power source coupled to the trailing shield.

The first AC power source is configured to flow alternating current from the main pole, through the contact, to the contact terminal. The second AC power source is configured to flow alternating current from the trailing shield, through the STO device, to the main pole. The contact is recessed a distance of about 100 nm to about 200 nm from the MFS, and wherein the contact comprises a conducting, non-magnetic material. The first AC power source supplies alternating current at a frequency of about 15 GHz to about 30 GHz. The first AC power source is configured to generate an AC field, and wherein the AC field is configured to generate spin waves near the contact to transfer energy to the STO device.

In yet another embodiment, a magnetic recording device comprises a main pole, the main pole comprising a contact recessed from a media facing surface (MFS) and a contact terminal coupled to the contact, a trailing shield disposed adjacent to the main pole, a spin torque oscillator (STO) device disposed between the main pole and the trailing shield at the MFS, a leading shield disposed adjacent to the main pole, the leading shield being disposed between the contact and the MFS, a first terminal coupled to the trailing shield, a second terminal coupled to the main pole, and a third terminal coupled to the contact terminal.

The first terminal and the second terminal are configured to generate a first path from the trailing shield, through the STO device, to the main pole. A first AC source is coupled to the first terminal and the second terminal to supply alternating current to the first current path at a frequency of about 15 GHz to about 30 GHz. The second terminal and the third terminal are configured to generate a second path from the main pole, through the contact, to the contact terminal. A second AC source is coupled to the second terminal and the third terminal to supply alternating current to the second current path at a frequency of about 15 GHz to about 30 GHz. The contact is recessed a distance of about 100 nm to about 200 nm from the MFS, and wherein the contact comprises a conducting, non-magnetic material. The contact is disposed perpendicular to a longitudinal axis of the main pole, and wherein the contact terminal is disposed parallel to the main pole.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
a main pole, the main pole comprising:
    a first contact recessed from a media facing surface (MFS), wherein the first contact is disposed perpendicular to a longitudinal axis of the main pole; and
    a second contact recessed from the MFS, wherein a conductive current path is formed from the second contact through a portion of the main pole to the first contact;
a trailing shield disposed adjacent to the main pole;
a spin torque oscillator (STO) device disposed between the main pole and the trailing shield at the MFS; and
a leading shield disposed adjacent to the main pole, the leading shield being disposed between the first contact and the MFS.

2. The magnetic recording head of claim 1, wherein the first contact is recessed a distance of about 100 nm to about 200 nm from the MFS.

3. The magnetic recording head of claim 1, wherein the first contact comprises a conducting, non-magnetic material.

4. The magnetic recording head of claim 1, wherein the first contact is coupled with an alternating current (AC) source.

5. The magnetic recording head of claim 1, wherein a contact terminal is coupled to the first contact, the contact terminal extending parallel to a longitudinal axis of the main pole.

6. A magnetic recording device comprising the magnetic recording head of claim 1.

7. The magnetic recording device of claim 6, wherein, during operation, an alternating current is configured to flow from the main pole towards the MFS to the first contact in an L-like shape.

8. A magnetic recording device, comprising:
a main pole, the main pole comprising a contact recessed from a media facing surface (MFS) and a contact terminal coupled to the contact, wherein the contact is disposed perpendicular to a longitudinal axis of the main pole;
a trailing shield disposed adjacent to the main pole;
a spin torque oscillator (STO) device disposed between the main pole and the trailing shield at the MFS;
a leading shield disposed adjacent to the main pole, the leading shield being disposed between the contact and the MFS;
a first alternating current (AC) power source coupled to the contact terminal; and
a second AC power source coupled to the trailing shield.

9. The magnetic recording device of claim 8, wherein the first AC power source is configured to flow alternating current from the main pole, through the contact, to the contact terminal.

10. The magnetic recording device of claim 8, wherein the second AC power source is configured to flow alternating current from the trailing shield, through the STO device, to the main pole.

11. The magnetic recording device of claim 8, wherein the contact is recessed a distance of about 100 nm to about 200 nm from the MFS, and wherein the contact comprises a conducting, non-magnetic material.

12. The magnetic recording device of claim 8, wherein the first AC power source supplies alternating current at a frequency of about 15 GHz to about 30 GHz.

13. The magnetic recording device of claim 8, wherein the first AC power source is configured to generate an AC field, and wherein the AC field is configured to generate spin waves near the contact to transfer energy to the STO device.

14. A magnetic recording device, comprising:

a main pole, the main pole comprising a contact recessed from a media facing surface (MFS) and a contact terminal coupled to the contact, wherein the contact is disposed perpendicular to a longitudinal axis of the main pole;

a trailing shield disposed adjacent to the main pole;

a spin torque oscillator (STO) device disposed between the main pole and the trailing shield at the MFS;

a leading shield disposed adjacent to the main pole, the leading shield being disposed between the contact and the MFS;

a first terminal coupled to the trailing shield;

a second terminal coupled to the main pole; and a third terminal coupled to the contact terminal.

15. The magnetic recording device of claim 14, wherein the first terminal and the second terminal are configured to generate a first path from the trailing shield, through the STO device, to the main pole.

16. The magnetic recording device of claim 15, wherein a first AC source is coupled to the first terminal and the second terminal to supply alternating current to the first path at a frequency of about 15 GHz to about 30 GHz.

17. The magnetic recording device of claim 14, wherein the second terminal and the third terminal are configured to generate a second path from the main pole, through the contact, to the contact terminal.

18. The magnetic recording device of claim 17, wherein a second AC source is coupled to the second terminal and the third terminal to supply alternating current to the second path at a frequency of about 15 GHz to about 30 GHz.

19. The magnetic recording device of claim 14, wherein the contact is recessed a distance of about 100 nm to about 200 nm from the MFS, and wherein the contact comprises a conducting, non-magnetic material.

20. The magnetic recording device of claim 14, wherein the contact terminal is disposed parallel to the main pole.

\* \* \* \* \*